United States Patent
Ross

(10) Patent No.: US 11,403,157 B1
(45) Date of Patent: Aug. 2, 2022

(54) IDENTIFYING A ROOT CAUSE OF AN ERROR

(71) Applicant: Splunk Inc., San Francisco, CA (US)

(72) Inventor: Joseph Ari Ross, Redwood City, CA (US)

(73) Assignee: Splunk Inc., San Francisco, CA (US)

( * ) Notice: Subject to any disclaimer, the term of this patent is extended or adjusted under 35 U.S.C. 154(b) by 155 days.

(21) Appl. No.: 16/778,165

(22) Filed: Jan. 31, 2020

(51) Int. Cl.
 *G06F 11/07* (2006.01)
 *H04L 41/0631* (2022.01)

(52) U.S. Cl.
 CPC ........ *G06F 11/0709* (2013.01); *G06F 11/079* (2013.01); *G06F 11/0748* (2013.01); *H04L 41/0631* (2013.01)

(58) Field of Classification Search
 CPC ............... G06F 11/079; G06F 11/0709; G06F 11/0748; G06F 11/302; G06F 11/3466; H04L 41/0631; H04L 41/065; H04L 41/0636
 See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,156,378 B1 * | 4/2012 | Suit | G06F 11/327 714/26 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,037,232 B1 * | 7/2018 | Garcia | G06F 11/3476 |
| 10,127,258 B2 | 11/2018 | Lamas et al. | |
| 2007/0168915 A1 * | 7/2007 | Fabbio | G06F 11/0751 717/101 |
| 2015/0135312 A1 * | 5/2015 | Wada | G06F 11/3409 726/22 |
| 2017/0075749 A1 * | 3/2017 | Ambichl | G06F 11/0748 |
| 2018/0123922 A1 * | 5/2018 | Nataraj | H04L 41/0631 |
| 2019/0098106 A1 | 3/2019 | Mungel et al. | |
| 2020/0106660 A1 * | 4/2020 | Kakani | G06F 11/0709 |

(Continued)

OTHER PUBLICATIONS

Splunk Enterprise 8.0.0 Overview, available online, retrieved May 20, 2020 from docs.splunk.com.

(Continued)

*Primary Examiner* — Yolanda L Wilson
(74) *Attorney, Agent, or Firm* — McDermott Will & Emery LLP

(57) ABSTRACT

A process for analyzing an incident includes setting up an alert for a high error rate on a particular endpoint. Once the alert is triggered, a set of traces for transactions exhibiting errors on the offending endpoint is queried. All traces for other services/operations that include errors on the offending endpoint are also enumerated. A set of baseline transactions that involve the offending endpoint, but do not result in error may be utilized to determine whether the errors are always present, or are distinctive for certain offending transactions. All traces are ranked based on a statistic. Once the traces have been ranked, they may be traced down to a deepest/most terminal error. A set of transactions that correlate to the terminal error may also be analyzed to determine infrastructure causes.

30 Claims, 12 Drawing Sheets

(56) References Cited

U.S. PATENT DOCUMENTS

2020/0364128 A1* 11/2020 Vittal .................. G06F 9/45558
2021/0111943 A1* 4/2021 Moser ................. G06F 11/3466
2021/0133014 A1* 5/2021 Agarwal ............... G06F 11/079

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.

\* cited by examiner

| | Endpoint Error | Endpoint Non-error |
|---|---|---|
| Contains error trace | A | B |
| Does not contain error trace | C | D |

| | Operation Error | Operation Non-error |
|---|---|---|
| host:hostname | E | F |
| Not host:hostname | G | H |

…

IDENTIFYING A ROOT CAUSE OF AN ERROR

TECHNICAL FIELD

The present disclosure generally relates to analysis of instrumented software, and more particularly, to an incident analyzer for identifying a root cause of an error.

BACKGROUND

Software developers monitor different aspects of software they develop by instrumenting the code. These include performance of the software, errors encountered during execution of the software, significant events encountered during execution of the software, information describing which parts of code are being executed and which parts are not being executed, and so on. Conventional techniques for instrumenting code include statements in the code that output different types of information to log files or print information on screens. This type of instrumentation is suitable for simple applications, for example, applications having a simple flow of execution that execute on a single processor.

Conventional user environments are complicated because they include many micro transactions that are handled by a variety of hosts, containers, and infrastructure platforms. As a result, it is difficult to identify a root cause of an alert for a network problem, bad process, poor service, etc.

BRIEF SUMMARY

Embodiments of the present disclosure provide for an incident analyzer that attributes a high error rate in an endpoint to an offending infrastructure element in order to efficiently identify a root cause of a problem. Once identified, the root cause may be diagnosed and corrected. A process for analyzing an incident may include setting up an alert for a high error rate on a particular endpoint. Once the alert is triggered, a set of traces for transactions exhibiting errors on the offending endpoint is queried. All traces (e.g., paths) for other services/operations that include errors on the offending endpoint are also enumerated. A set of baseline transactions (e.g., that involve the offending endpoint, but do not result in error) may be utilized to determine whether the errors are always present, or are distinctive for certain offending transactions. All traces are ranked based on a statistic (e.g., chi-squared or other statistic). Once the traces have been ranked, they may be traced down to a deepest/ most terminal error. A set of transactions that correlate to the terminal error may also be analyzed to determine infrastructure causes.

According to embodiments of the present disclosure, a computer-implemented method for identifying a root cause of an error is provided. The method includes obtaining an error rate for an endpoint in a collection of services. The method also includes determining whether the error rate exceeds a threshold. The method also includes, in response to determining that the error rate exceeds the threshold, retrieving a set of traces including the endpoint that resulted in an error. The method also includes selecting a plurality of candidate error traces from the set of traces based on operations downstream from the endpoint. The method also includes ranking the plurality of candidate error traces. The method also includes identifying a root cause of the error based on the ranking of the plurality of candidate error traces. The method also includes causing for display a graphical representation of the root cause of the error.

According to one embodiment of the present disclosure, a system for identifying a root cause of an error is provided. The system may include at least one memory having instructions stored thereon. The system may also include at least one processor configured to execute the instructions, wherein the at least one processor is configured to monitor error rates for endpoints of multiple transactions. The processor may further be configured to obtain an error rate for an endpoint in a collection of services. The processor may further be configured to determine whether the error rate exceeds a threshold. The processor may further be configured to, in response to determining that the error rate exceeds the threshold, retrieve a set of traces including the endpoint that resulted in an error. The processor may further be configured to select a plurality of candidate error traces from the set of traces based on operations downstream from the endpoint. The processor may further be configured to rank the plurality of candidate error traces. The processor may further be configured to identify a root cause of the error based on the ranking of the plurality of candidate error traces. The processor may further be configured to cause for display a graphical representation of the root cause of the error.

According to one embodiment of the present disclosure, non-transitory computer-readable storage medium comprising instructions stored thereon, which when executed by one or more processors, cause the one or more processors to perform operations for identifying a root cause of an error. The operations may include obtaining an error rate for an endpoint in a collection of services. The operations may also include determining whether the error rate exceeds a threshold. The operations may also include, in response to determining that the error rate exceeds the threshold, retrieving a set of traces including the endpoint that resulted in an error. The operations may also include selecting a plurality of candidate error traces from the set of traces based on operations downstream from the endpoint. The operations may also include ranking the plurality of candidate error traces. The operations may also include identifying a root cause of the error based on the ranking of the plurality of candidate error traces. The operations may also include causing for display a graphical representation of the root cause of the error.

According to one embodiment of the present disclosure, a system is provided that includes means for storing instructions, and means for executing the stored instructions that, when executed by the means, causes the means to perform a method for identifying a root cause of an error. The method includes obtaining an error rate for an endpoint in a collection of services. The method also includes determining whether the error rate exceeds a threshold. The method also includes, in response to determining that the error rate exceeds the threshold, retrieving a set of traces including the endpoint that resulted in an error. The method also includes selecting a plurality of candidate error traces from the set of traces based on operations downstream from the endpoint. The method also includes ranking the plurality of candidate error traces. The method also includes identifying a root cause of the error based on the ranking of the plurality of candidate error traces. The method also includes causing for display a graphical representation of the root cause of the error.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

Figure 1:
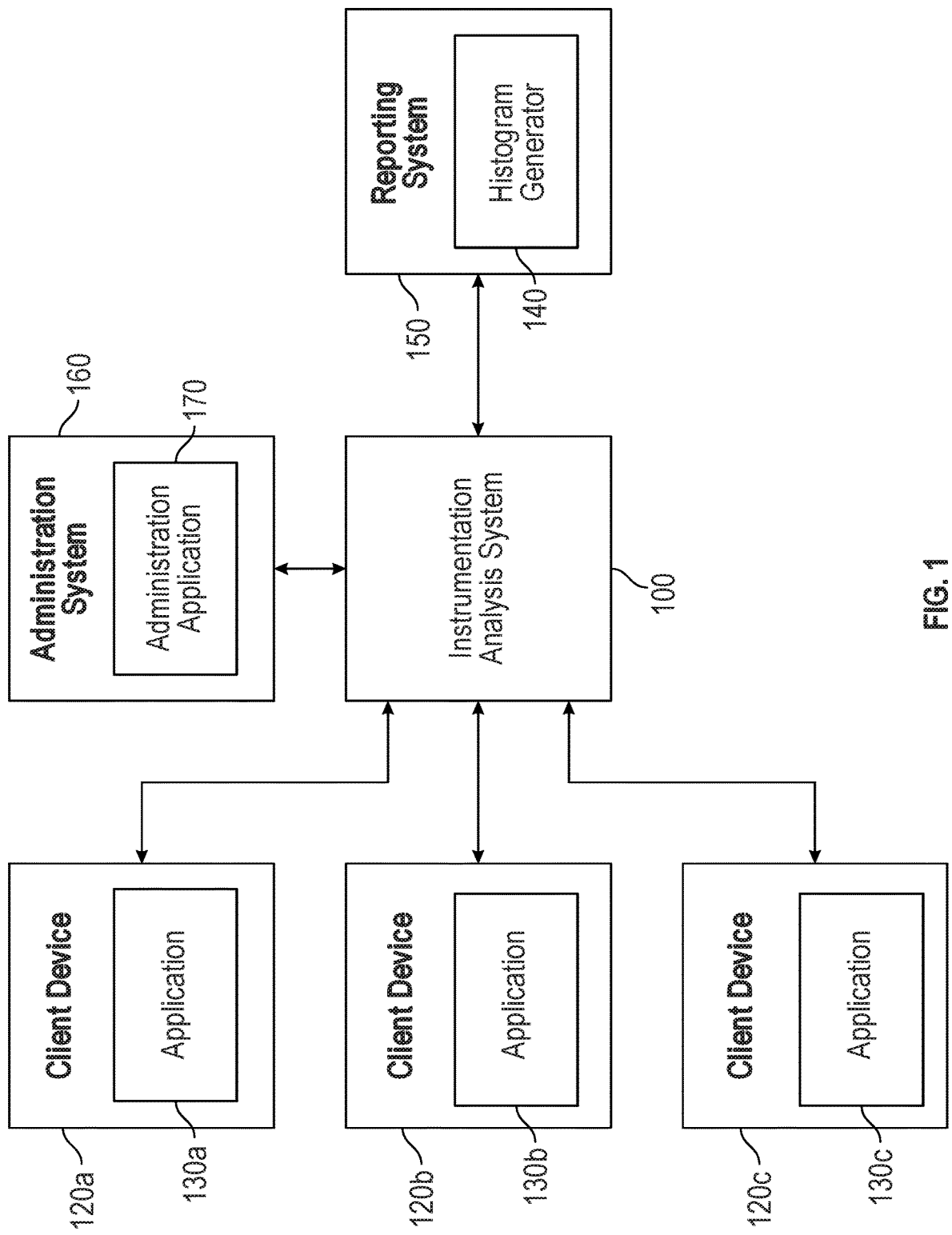
FIG. 1 shows an overall system environment for reporting based on instrumented software, according to an embodiment of the present disclosure.

Trace and Span Sampling and Analysis for Instrumented Software

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "trace" as used herein generally refers to a record of the manner in which a single user request, also referred to as a transaction, propagates from one microservice (hereinafter, interchangeably, referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. A trace, in one embodiment, may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g. tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant:gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region:east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more dimensions results in a metric data point. A single metric data point may include multiple measurements and multiple dimensions. Metrics are used to track and assess the status of one or more processes. A metric typically comprises a numeric value that is stored as a timeseries.

Software developers monitor different aspects of software they develop by instrumenting the software. These aspects include performance of the software, disk utilization of the software, CPU utilization of the software, errors encountered during execution of the software, significant events encountered during execution of the software, information describing which parts of the code are being executed and which parts are not being executed, and so on. After development, similar aspects of the software are also monitored during production, for example, when software is being executed on a cloud architecture.

Conventional user environments are complicated because they include many micro transactions that are handled by a variety of hosts, containers, and infrastructure platforms. As a result, it is difficult to identify a root cause of an alert for a network problem, bad process, poor service, etc.

Computing operations can be described by spans and traces. A span may include an atomic computing operation performed in handling a request, and may include an operation name (e.g., "start"), a service (e.g., "analytics"), and start and end timestamps. Spans may be annotated with additional tags, such as key:value pairs, that provide further context regarding the execution environment. For example, a trace may include a set of spans traversed in the handing of a single request.

According to embodiments, each span and trace may have a duration equal to the difference between the start and end timestamps for the span, or for the group of spans forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be five times the $99^{th}$ percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-values less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example by multiplying the p-value by the total number of tags. This procedure defines a map from tags to non-negative real numbers. The analysis system sorts the tags by the associated p-value (in ascending order) and returns those with p-values less than or equal to some threshold, e.g., 0.01.

Architecture of a Metadata System in a Metrics Engine

FIG. 1 shows the overall system environment for reporting based on instrumented software, according to an embodiment. The overall system environment includes an instrumentation analysis system 100, one or more client devices 120, an administration system 160, and a reporting system 150. In other embodiments, more or less components than those indicated in FIG. 1 may be used. For example, client devices 120, administration system 160, and reporting system 150 may interact with instrumentation analysis system 100 via a network (not shown in FIG. 1). Furthermore, there may be more or less instances of each system shown in FIG. 1; for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a" and/or "130b" in the figures).

The instrumentation analysis system 100 receives data comprising values of metrics sent by different client devices 120 (e.g., the instrumentation analysis system 100 may also be referred to herein as an analysis system or a data analysis system). A client device 120 executes instrumented software, for example, application 130. Although, application 130 is shown in FIG. 1 as an example of instrumented software, the techniques disclosed herein are not limited to application software but are applicable to other kinds of software, for example, server software, software executing on customer devices, websites, and so on. Furthermore, a client device 120 may include any computing system that is configured to execute instrumented software, whether or not it is used for development of improved software. For example, the client device 120 may be a computing system used for testing purposes, staging purposes, or any production system executing in an enterprise.

The software executing on a client device 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. In an implementation, the application 130 may send data to the instrumentation analysis system 100 by invoking an application programming interface (API) supported by the instrumentation analysis system 100.

A gauge comprises instructions to measure certain runtime characteristics of the application 130, for example, heap size, number of cache misses or hits, active memory used, central processing unit (CPU) utilization, total time taken to respond to a request, time taken to connect to a service, and so on. A gauge may also be used to track certain application-specific parameters or business related values, for example, number of transactions, number of users, and so on. The gauge may be invoked periodically based on an interval that is configurable. The value of the gauge is sent to instrumentation analysis system 100 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 160.

The administration system 160 allows a privileged user, for example, a system administrator, to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify the application 130.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of the application 130.

Furthermore, the instrumentation analysis system 100 provides separation of the metadata describing the data streams from the data of the data streams. Accordingly, the amount of data that needs to be transmitted from the client devices 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be configured to generate a histogram to analyze generated spans and traces. In an implementation, the reporting system 150 may include a histogram generator 140 that interacts with the instrumentation analysis system 100 to generate a histogram.

The reporting system 150 can be a conventional computer system (e.g., a desktop or laptop computer), a tablet, or a device having computer functionality such as a personal digital assistant (PDA), a mobile telephone, a smart phone, or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage, and input/output controller. The computing system used for hosting the instrumentation analysis system 100 is typically a server-class system that uses powerful processors, large memory, and fast input/output systems compared to a typical computing system used, for example, as a reporting system 150.

In an embodiment, data from several client devices 120 may be consolidated, for example, by a server and the combined data sent to the instrumentation analysis system 100. For example, an enterprise may install a server that receives data streams internally from different client devices 120 and sends the combined data in a batch form to the instrumentation analysis system 100 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are CPU load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions more than the two dimensions (i.e., source and metric name) described above. For example, if each server has multiple CPUs, a dimension cpu_id may be included. Accordingly, each data stream obtained from a system may be characterized by (source_id, cpu_id, metric_name), i.e., a source identifier, a CPU identifier, and a name for the metric. Examples of data streams identified using three coordinates include (server1, cpu1, load), (server1, cpu2, load), (server2, cpu1, load), (server2, cpu2, load), and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 120. The customer name may be specified for the instrumented software using a system property. The instrumented software includes the customer name when it identifies a data stream associated with that particular customer. The ability to associate a data stream with a customer allows the instrumentation analysis system to perform customer-specific analysis, for example, report on usages of systems for each customer, identify customers reporting more than a threshold number of errors, and so on.

A data stream may be obtained from instrumented software or may be generated as a result of execution of blocks of a data stream language program within the instrumentation analysis system 100. A data stream may also comprise data stored in the instrumentation analysis system 100, for example, in a data store, such as a time series data store 260, described herein.

Figure 2:
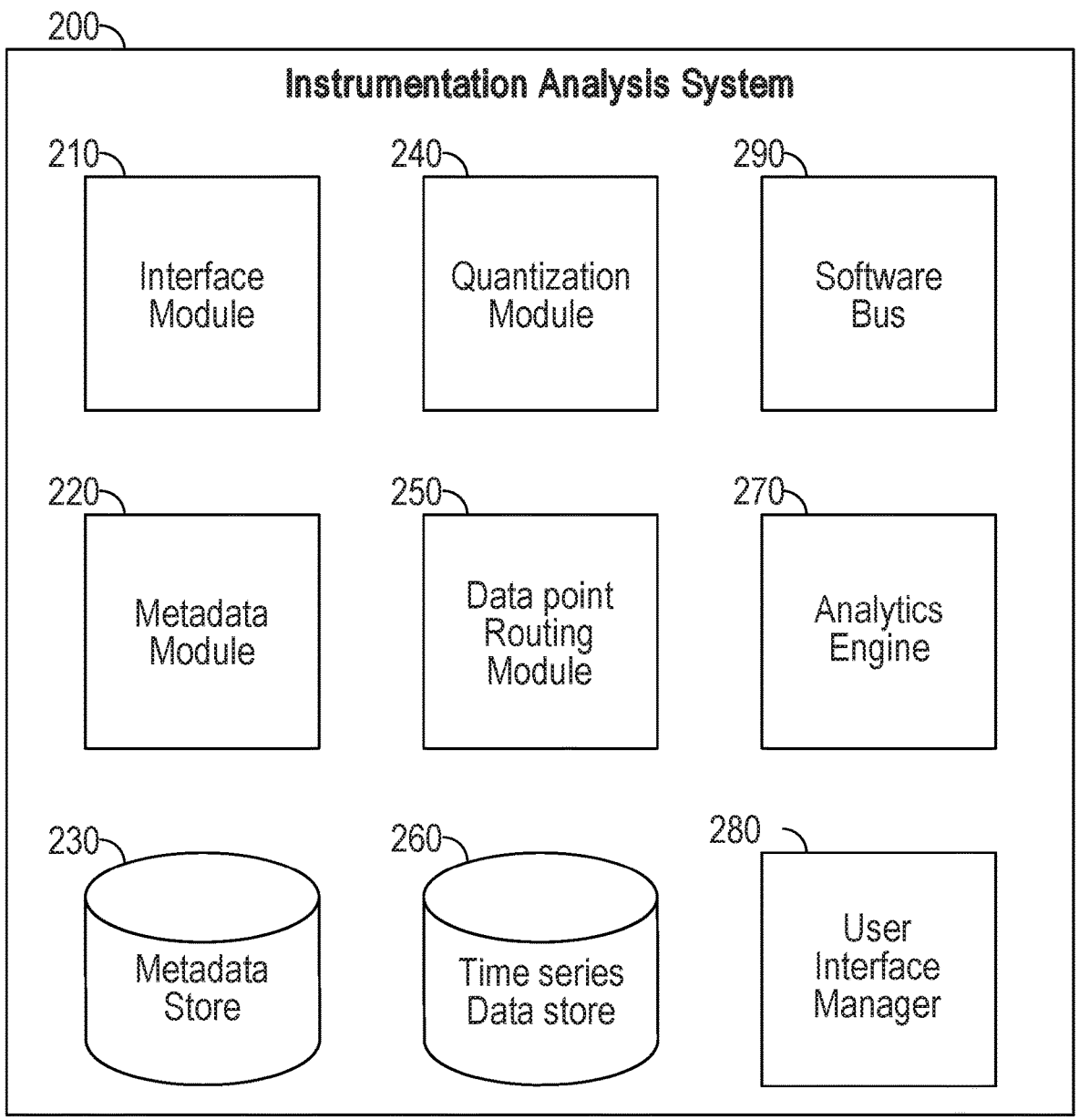
FIG. 2 shows an architecture of a system for processing data streams received from instrumented software, according to an embodiment of the present disclosure.

FIG. 2 shows an architecture of a system for processing data streams received from instrumented software, according to an embodiment. The instrumentation analysis system 200 includes an interface module 210, a quantization module 240, metadata module 220, metadata store 230, a data point routing module 250, an analytics engine 270, a user interface manager 280, a time series data store 260, and a software bus 290. In other embodiments, the instrumentation analysis system 200 may include other modules not described herein. Functionality indicated as provided by a particular module may be implemented by other modules instead.

The interface module 210 receives requests from external systems, for example, client devices 120 that communicate with the instrumentation analysis system 200. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams comprising spans and traces from one or more client devices 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, and one or more properties associated with the data.

In an embodiment, the timestamp associated with a tuple represents the time that the data value was received by the instrumentation analysis system 200. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 200.

The metadata module 220 receives and stores metadata information describing various data streams received from the client devices 120. In an embodiment, the metadata stored in the metadata module 220 is received from a user, for example, a system administrator interacting with the instrumentation analysis system 200 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 230 stores the metadata objects and their associations with the data streams. The metadata store 230 stores an identifier (ID) for each metadata object and the properties represented by the metadata object. In an embodiment, each data stream is associated with a time series identifier that uniquely identifies the data stream. The metadata store 230 stores an index that maps each metadata object to a set of time series identifier values. The metadata store 230 may receive instructions to modify a metadata object. For example, the metadata store 230 may receive instructions to modify, add, or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The time series data store 260 stores data received from various sources, for example, client devices 120. The time series data store 260 is also referred to herein as a time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by a user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 200 to provide data of data streams to other modules of the instrumentation analysis system 200. A data stream language program may send a data stream to the software bus 290. Other modules, for example, fetch modules, window modules, and so on, can read the data from the software bus 290 and perform further processing on the data. For example, a data stream output of a data stream language program published on the software bus 290 may be identified by a find block of another data stream language program executing as a job.

Identifying a Root Cause of an Error

Conventional user environments are complicated because they include many micro-transactions that are handled by a variety of hosts, containers, and infrastructure platforms. Alerts may be set up by a system administrator to aid in tracking the occurrence of errors in a user environment. However, the alerts only identify that a problem has occurred. Due to the complex nature of conventional user environments, the root of the problem may have occurred in any one of thousands of possibilities. As a result, it is difficult to identify a root cause of an error (e.g., a network problem, a bad process, poor service, etc.). Tracing of instrumented software may be utilized to identify a root cause of an error. However, conventional methods require manual tracing of each operation to its source, which is time consuming and difficult.

Embodiments of the present disclosure provide for an incident analyzer that attributes a high error rate in an endpoint to an offending infrastructure element in order to efficiently identify a root cause of an error (e.g., problem). Once identified, the root cause may be diagnosed and corrected. A process for analyzing an incident may include setting up an alert for a high error rate on a particular endpoint. Once the alert is triggered, a set of traces for transactions exhibiting errors on the offending endpoint is queried. All traces for other services/operations that include errors on the offending end point are also enumerated. A set of baseline transactions (i.e., that involve the offending endpoint, but do not result in error) may be utilized to determine whether the errors are always present, or are distinctive for certain offending transactions. All traces are ranked based on a statistic (e.g., chi-squared or other statistic). Once the traces have been ranked, they may be traced down to a deepest/most terminal error. A set of transactions that correlate to the terminal error may also be analyzed to determine infrastructure causes. Additionally, an object of the disclosure is to identify a cause of an elevated error rate.

The disclosed system addresses a problem in traditional data analysis of instrumented software tied to computer technology, namely, the technical problem of identifying a root cause of an error. The disclosed system solves this technical problem by providing a solution also rooted in computer technology, namely, by providing for an incident analyzer that attributes a high error rate in an endpoint to an offending infrastructure element in order to efficiently identify a root cause of a problem. The disclosed subject technology further provides improvements to the functioning of the computer itself because it optimizes resources for tracing an error back to its source for correction.

Figure 3:
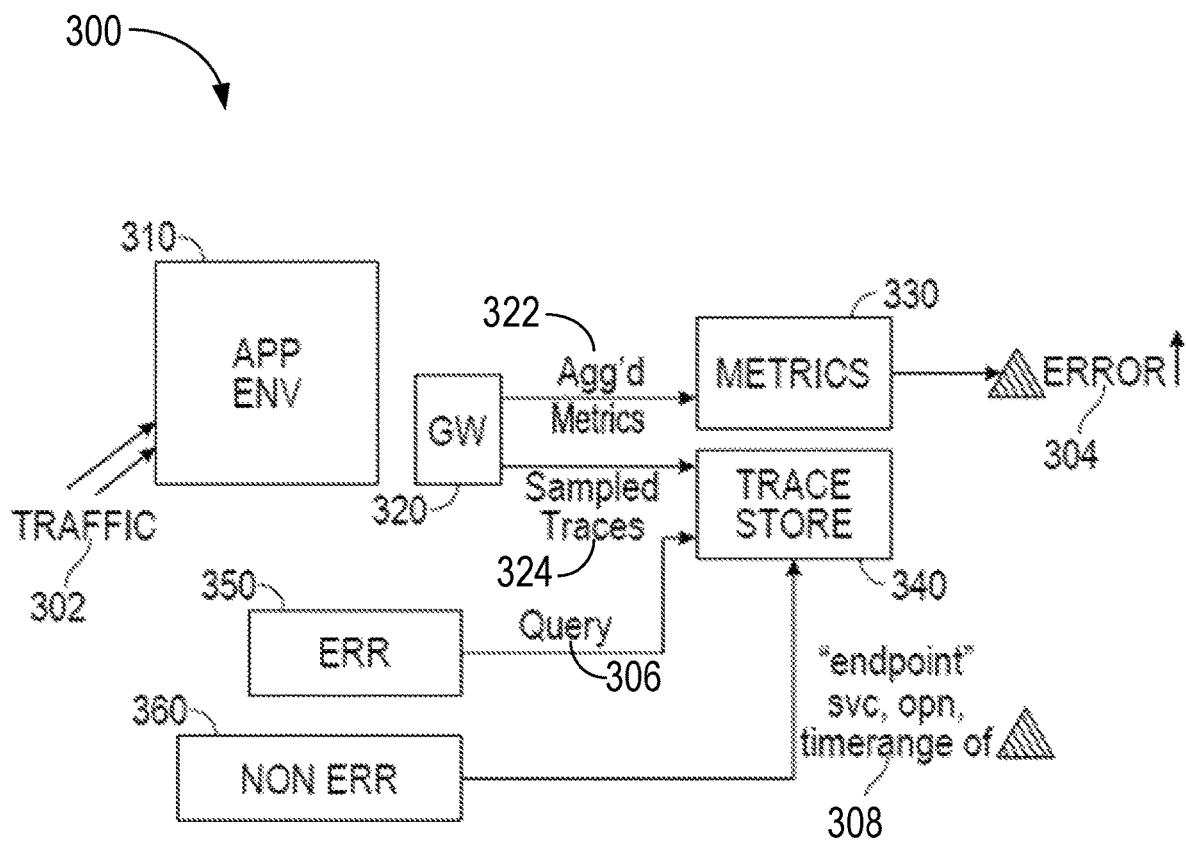
FIG. 3 shows an example of a system for identifying a root cause of an alert, according to an embodiment of the present disclosure.

FIG. 3 shows an example of a system 300 for identifying a root cause of an error (e.g., alert 304). The system may include an application environment 310, a gateway 320, a metrics database 330, and a trace database 340. According to an embodiment of the present disclosure, network traffic 302 is received by the application environment 310. The gateway 320 forwards a portion of the received network traffic 302 as sampled traces 324 to the trace database 340. For example, the network traffic 302 may be sampled to generate a subset of traces with a preference for errors, latency, rare executions, and other traces of interest (e.g., that may indicate problems). The gateway 320 may also be configured to send aggregated traces 322 as metrics to the metrics database 330.

Based on the received aggregated traces 322 and the sampled traces 324, a system administrator may configure the alert 304 to be generated when a configured threshold has been reached. For example, the alert 304 may be generated when an error rate is above a threshold. According to embodiments, an alert 304 may be generated when an error rate is in violation of manually defined rules (e.g., greater than 10% over a duration of 5 minutes, or the like), or when there is a growth in error rate (e.g., error rate over the last 5 minutes is more than twice the error rate of the preceding hour). It is understood that other alerts may similarly be generated with different thresholds. In this way, the network traffic 302 may be monitored for error rates of endpoints.

Once an alert 304 is received, the system 300 may be configured to automatically query 306 an error set 350 and a baseline set 360 (e.g., a non-error set) from the trace database 340. For example, the error set 350 may include traces having an endpoint that triggered the alert 304 (e.g., in which the endpoint resulted in an error). The baseline set 360 may include traces having the endpoint in which the endpoint executed successfully. The error set 350 and the non-error set 360 may be scoped by a time range determined by the alert 304. For example, the query 306 may further be scoped by the endpoint that resulted in the error, a service, and/or an operation 308, etc.

Figures 4, 5:
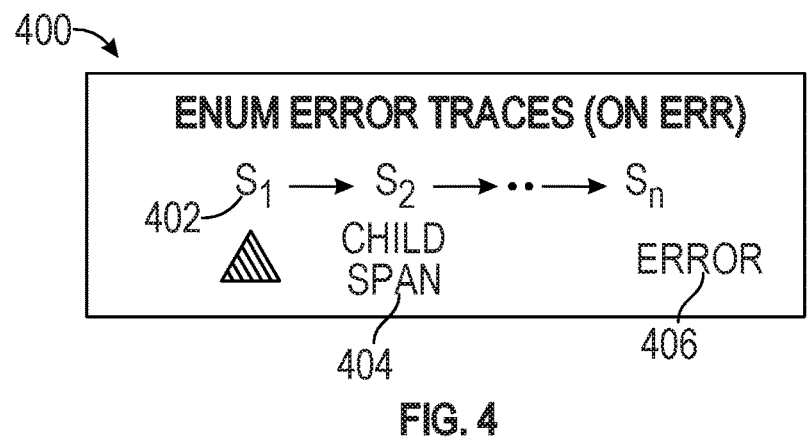
FIG. 4 illustrates enumerated error traces, according to an embodiment of the present disclosure.
FIG. 5 illustrates an example matrix of counts of error traces, according to an embodiment of the present disclosure.

From the error set 350, a collection of candidate error traces 400 (as shown in FIG. 4) may be extracted from a subtree of operations rooted at the offending endpoint. For example, downstream errors (e.g., terminal errors) of the subtree of operations may be utilized to identify a root cause of the error at the endpoint.

Referring now to FIG. 4, an error trace 400 may include a sequence of spans that includes s1, s2, . . . , sn, in which a terminal span is also an error span. According to embodiments, s1 may include the offending endpoint operation 402, si may include the child span 404 of si−1 (for i=2, . . . , n), and sn may be a terminal span that includes an error span 406. For every error trace 400, a sum of occurrences in the error set 350 is calculated.

Having enumerated the error traces 400 in the error set 350, their occurrences are counted in the baseline set 360 as well. Then, for every error trace 400, a matrix of counts 500 is considered.

FIG. 5 illustrates an example matrix of counts 500 (e.g., a first matrix of counts) of error traces, according to an embodiment of the present disclosure. As illustrated, a first count A includes a count of traces that includes the error trace and the endpoint, in which an operation (e.g., transaction) performed by the endpoint resulted in the error. A second count B includes a count of traces that includes the error trace and the endpoint, in which an operation performed by the endpoint executed successfully. A third count C includes a count of traces that do not include the error trace, in which an operation performed by the endpoint resulted in the error. A fourth count D includes a count of traces that do not include the error trace, in which an operation performed by the endpoint executed successfully. According to embodiments, a sum of the first count A and the third count C is the size of the error set 350, and a sum of the second count B and the fourth count D is the size of the baseline set 360.

Assuming that $A/(A+B)>C/(C+D)$ (i.e., the probability of being an endpoint error given the error trace is present is higher than the probability of being an endpoint error given the error trace is not present), the value of a statistic on the counts A, B, C, and D may be associated with the trace. For example, the statistic may be a positive quantity, with higher values corresponding to a degree of over-representation less likely to be due to chance. The error traces may then be sorted by the value of the statistic. According to embodiments, the statistic may include a chi-squared statistic, a hypergeometric p-value, a likelihood ratio test, a t-test, etc.

In certain implementations, the statistic may not be defined if any row or column sum is zero. By construction $A \neq 0$. If $B=D=0$ (i.e., the baseline set 360 is empty), the error traces are instead sorted by $A/(A+C)$ (i.e., the proportion of the error set 350 including the given error trace). If $B \neq 0$ but $C=D=0$ (i.e., this error trace appears on every trace, both error and non-error), the trace is given a score of zero.

According to embodiments, the above-described process yields a set of traces that have a high likelihood of resulting in error at an endpoint. A similar analysis may be performed on terminal endpoints that appear in the highest ranking traces. For example, once the traces are sorted, there may only be two or three interesting traces based on predefined thresholds, which may all have different terminal errors. A correlation between that operation being an error and the infrastructure elements that were involved in handling those requests may then be analyzed to identify a specific infrastructure element that is causing a terminal error.

Figures 6, 7:
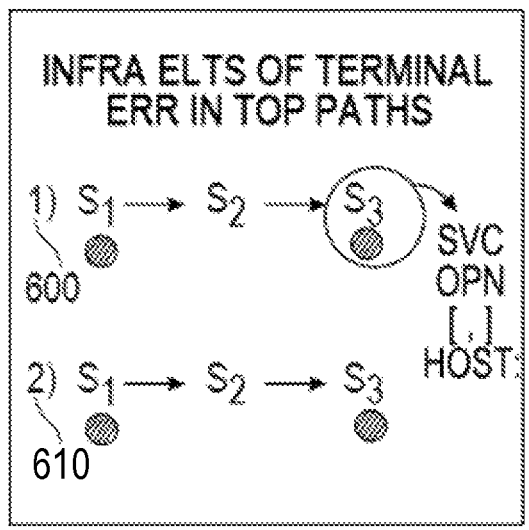
FIG. 6 illustrates enumerated top traces for determining infrastructure elements having a terminal error, according to an embodiment of the present disclosure.
FIG. 7 illustrates an example matrix of counts for every value of an infrastructure field having a given operation appearing as a terminal error, according to an embodiment of the present disclosure.

FIG. 6 illustrates enumerated top traces (e.g., a first trace 600 and a second trace 610) which may be utilized to determine infrastructure elements having a terminal error. As illustrated, the first trace 600 may include a sequence of spans including s1, s2, and s3. The second trace may include another sequence of spans including s1, s2', and s3'. For example, s1, s2', and s3' may all include errors. According to embodiments, each error trace contains a terminal error, which is the error span deepest in the subtree. For example, s3 is the terminal error of the first trace 600 and s3' is the terminal error of the second trace 610.

Every span may include an infrastructure element (e.g., host, pod, container, time period, operation, etc.) on which an execution occurred. The error behavior of these executions may be analyzed for possible infrastructure explanations. Specifically, for a given operation appearing as a terminal error, for every value of an infrastructure field (e.g., host), a matrix of counts is considered.

FIG. 7 illustrates an example matrix of counts 700 (e.g., a second matrix of counts) for every value of an infrastructure field having a given operation appearing as a terminal error, according to an embodiment of the present disclosure. For example, a fifth count E includes a count of specific infrastructure fields that include operation errors. A sixth count F includes a count of specific infrastructure fields that do not include operation errors. A seventh count G includes a count of other infrastructure fields that do not include the specific infrastructure fields that include operation errors. An eighth count H includes a count of the other infrastructure fields that do not include operation errors.

Similar to the above process described in FIG. 5, the same statistical routine may be applied to rank infrastructure elements by their correlation with the operation ending in an error. For example, assuming that $E/(E+F)>G/(G+H)$ (i.e., the probability of an operation error, given that a host has a hostname value, is higher than the probability of an operation error, given that the host does not have the hostname value), a hostname may be associated with the value of the statistic on the counts E, F, G, and H. The statistic is a positive quantity, with higher values corresponding to a degree of over-representation less likely to be due to chance. The hostnames may then be sorted by the value of the statistic. According to embodiments, the statistic may include a chi-squared statistic, a hypergeometric p-value, a likelihood ratio test, a t-test, etc.

In certain implementations, the statistic may not be defined if any row or column sum is zero. By construction $E \neq 0$ (i.e., the hostname appeared on at least one operation error span). If $F=H=0$ (i.e., the operation always resulted in an error), infrastructure elements may instead be sorted by E/(E+G) (i.e., the proportion of the operation errors involving the given hostname).

If F≠0 but G=H=0 (i.e., this hostname appeared on all instances of this span, both error and non-error), then, by the nature of infrastructure elements, this host ran all instances of the span in the scope of this analysis, so there are no interesting infrastructure patterns to detect.

It is understood that the above process may be utilized to identify infrastructure elements other than hostname. According to additional embodiments, the above-described processes may be implemented in a machine-learning algorithm to train the algorithm to identify problems and automatically diagnose them.

Process for Identifying a Root Cause of an Error

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
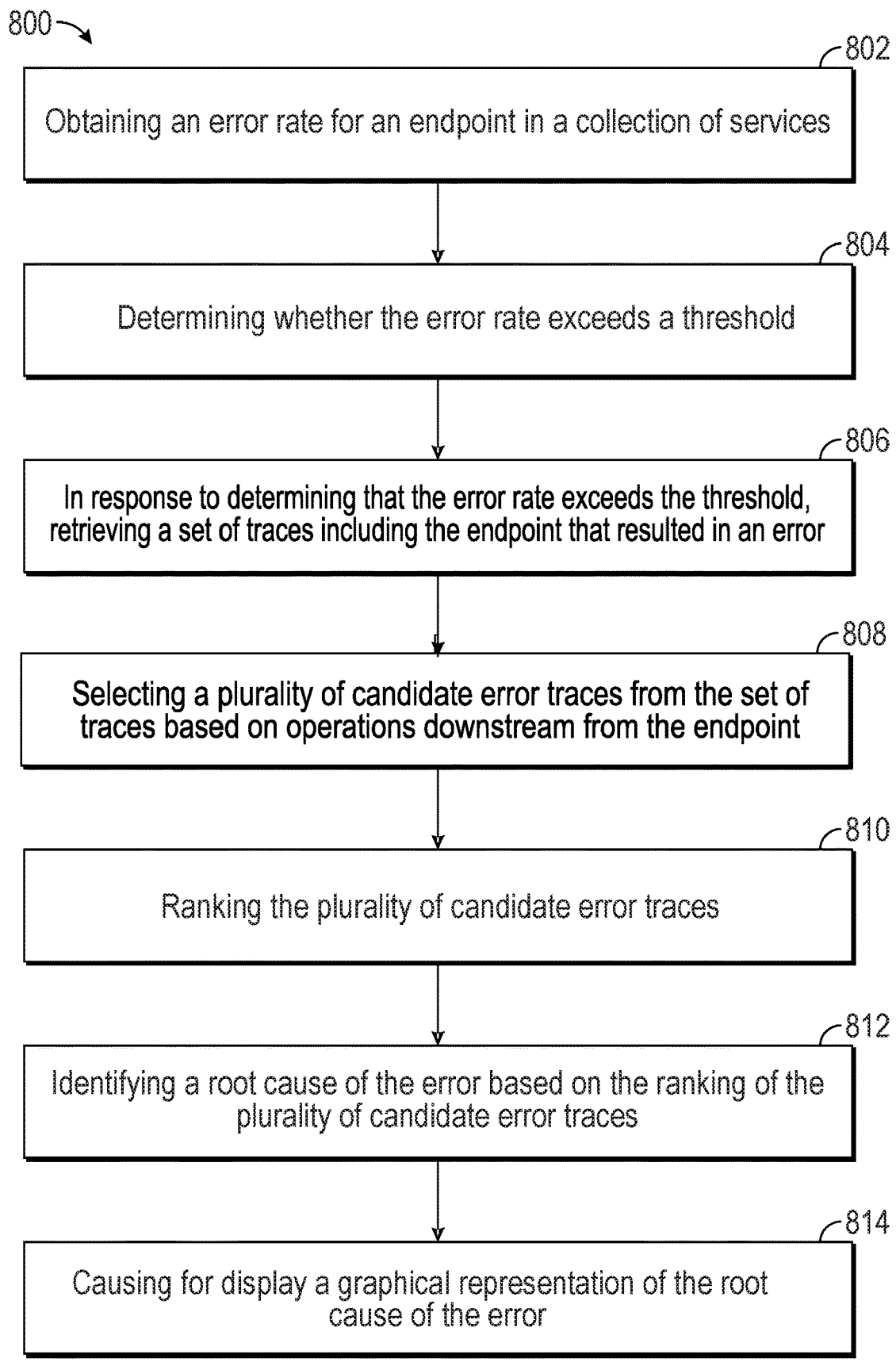
FIG. 8 is a flow diagram illustrative of an embodiment of a process for identifying a root cause of an alert, according to embodiments of the present disclosure.

FIG. 8 is a flow diagram illustrative of an embodiment of a process 800 for identifying a root cause of an error, according to embodiments of the disclosure. For explanatory purposes, the steps of the example process 800 are described herein as occurring in serial, or linearly. However, in some embodiments, multiple instances of the example process 800 may occur in parallel, and/or the various steps may be performed concurrently and/or in a different order or sequence than is described herein.

At step 802, an error rate for an endpoint in a collection of services is obtained. At step 804, it is determined whether the error rate exceeds a threshold. At step 806, in response to determining that the error rate exceeds the threshold, a set of traces is retrieved that includes the endpoint that resulted in an error. At step 808, a plurality of candidate error traces are selected from the set of traces based on operations downstream from the endpoint. At step 810, the plurality of candidate error traces are ranked. At step 812, a root cause of the error is identified based on the ranking of the plurality of candidate error traces. At step 814, a graphical representation of the root cause of the error is caused (e.g., generated) for display.

According to embodiments, retrieving the set of traces including the endpoint that resulted in an error further comprises retrieving an error set and a baseline set from a datastore in response to an alert that the error rate exceeds the threshold, the error set comprising traces including the endpoint that resulted in an error, the baseline set comprising traces including the endpoint that executed successfully.

According to embodiments, ranking the plurality of candidate error traces further comprises determining, for each trace, a first matrix of counts based on combinations of an error set and a baseline set, the error set comprising traces including the endpoint that resulted in an error, the baseline set comprising traces including the endpoint that executed successfully, and ranking the first matrix of counts based on a statistic.

According to embodiments, the process 800 further includes calculating a sum of traces that include an error trace and the endpoint, in which an operation performed by the endpoint resulted in the error, to determine a first count. The process 800 may further include calculating a sum of traces that include an error trace and the endpoint, in which an operation performed by the endpoint executed successfully, to determine a second count. The process 800 may further include calculating a sum of traces that do not include an error trace and the endpoint, in which an operation performed by the endpoint resulted in the error, to determine a third count. The process 800 may further include calculating a sum of traces that do not include an error trace and the endpoint, in which an operation performed by the endpoint executed successfully, to determine a fourth count.

According to embodiments, the process 800 further includes determining a probability that an endpoint results in an error, given an error trace is present, is higher than a probability that the endpoint results in the error given the error trace is not present.

According to embodiments, the process 800 further includes determining whether a baseline set is empty, the baseline set comprising traces including the endpoint that executed successfully. The process 800 may further include, in response to determining that the baseline set is empty, sorting error traces by a proportion of an error set including a given error trace.

According to embodiments, identifying the root cause of the error further comprises recording, on spans of the traces, an infrastructure element on which an execution occurred, and for values of an infrastructure field, determining a second matrix of counts based on combinations of operations and infrastructure elements.

According to embodiments, the process 800 further includes ranking a second matrix of counts based on a statistic, and determining a terminal error of a span of an error trace based on the ranking of the second matrix of counts, the terminal error identified by tracing the span to its corresponding infrastructure element.

According to embodiments, the process 800 further includes determining a second matrix of counts, comprising calculating a sum of infrastructure fields that include operation errors to determine a fifth count. The process 800 may further include calculating a sum of infrastructure fields that do not include operation errors to determine a sixth count. The process 800 may further include calculating a sum of other infrastructure fields that do not include the infrastructure fields that include operation errors to determine a seventh count. The process 800 may further include calculating a sum of other infrastructure fields that do not include operation errors to determine an eighth count.

According to embodiments, the process 800 further includes determining a probability of an operation error given an infrastructure field is higher than a probability of an operation error given another infrastructure field.

User Interface for Identifying a Root Cause of an Error

FIGS. 9 to 14 illustrate exemplary graphical user interfaces (GUIs) for identifying a root cause of an alert, according to embodiments of the present disclosure.

Figure 9:
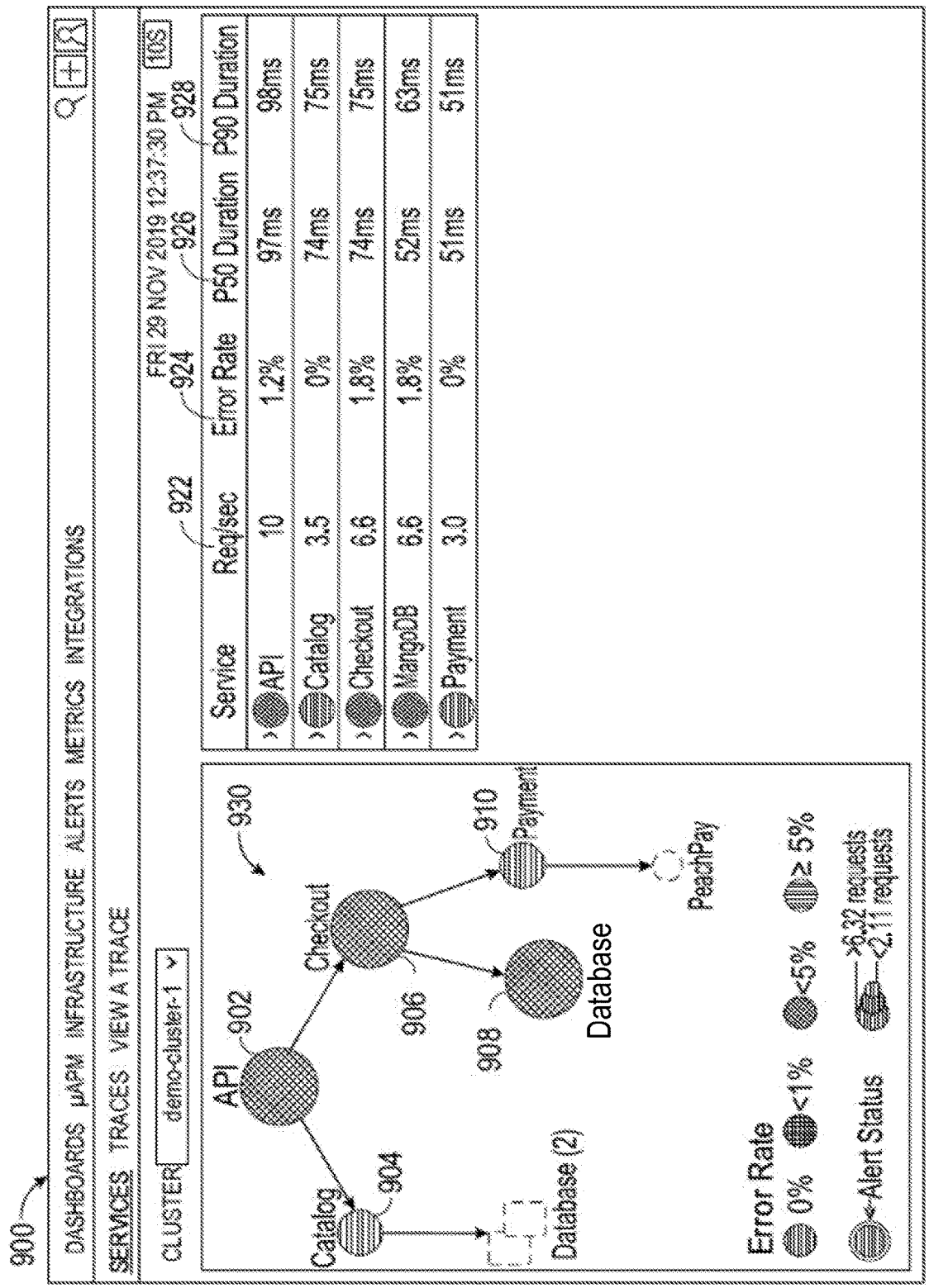
FIGS. 9 to 14 illustrate exemplary graphical user interfaces (GUIs) for identifying a root cause of an alert, according to embodiments of the present disclosure.

FIG. 9 illustrates a dashboard 900 of a distributed microservices environment 930 having nodes for api 902, catalog 904, checkout 906, database 908, and payment 910. Metrics including req/sec 922, error rates 924, P50 duration 926, and P90 duration 928 may also be displayed for each of the nodes 902 to 910. The distributed microservices environment 930 may display to a user the vertical dependencies of each of the nodes 902 to 910.

Figure 10:
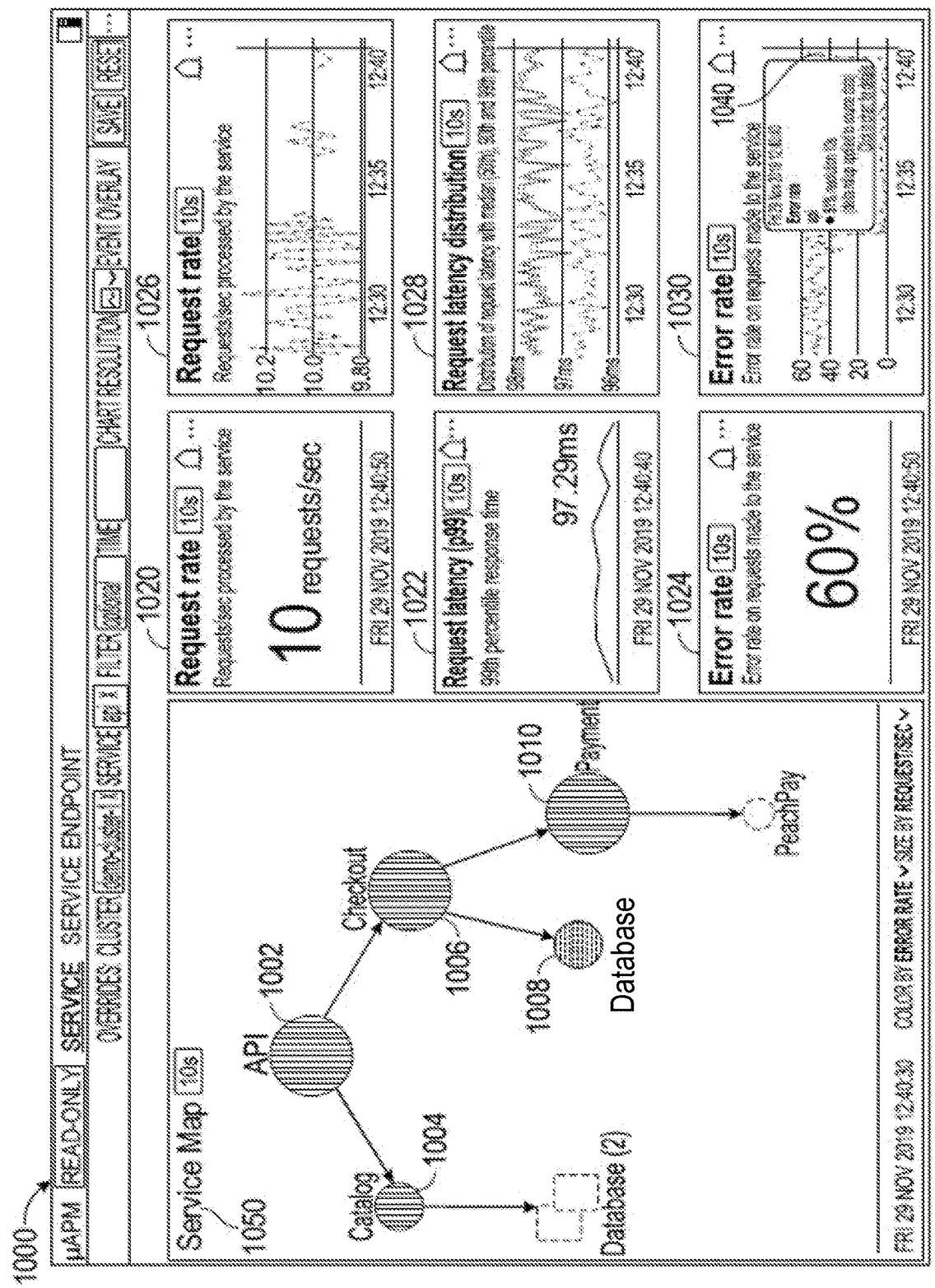

FIG. 10 illustrates a detailed view 1000 of the metrics of the dashboard 900 of FIG. 9. For example, a user may toggle the detailed view 1000 of the api 902 through the dashboard 900. The detailed view 1000 may include a service map 1050 illustrating each of the vertical dependencies of nodes api 1002, catalog 1004, checkout 1006, database 1008, and payment 1010. The detailed view 1000 may also display request rate 1020, latency 1022, error rate 1024, request rate 1026, request latency distribution 1028, and error rate tracking 1030. As illustrated, a spike 1040 in the error rate tracking 1030 has just been detected.

Figure 11:
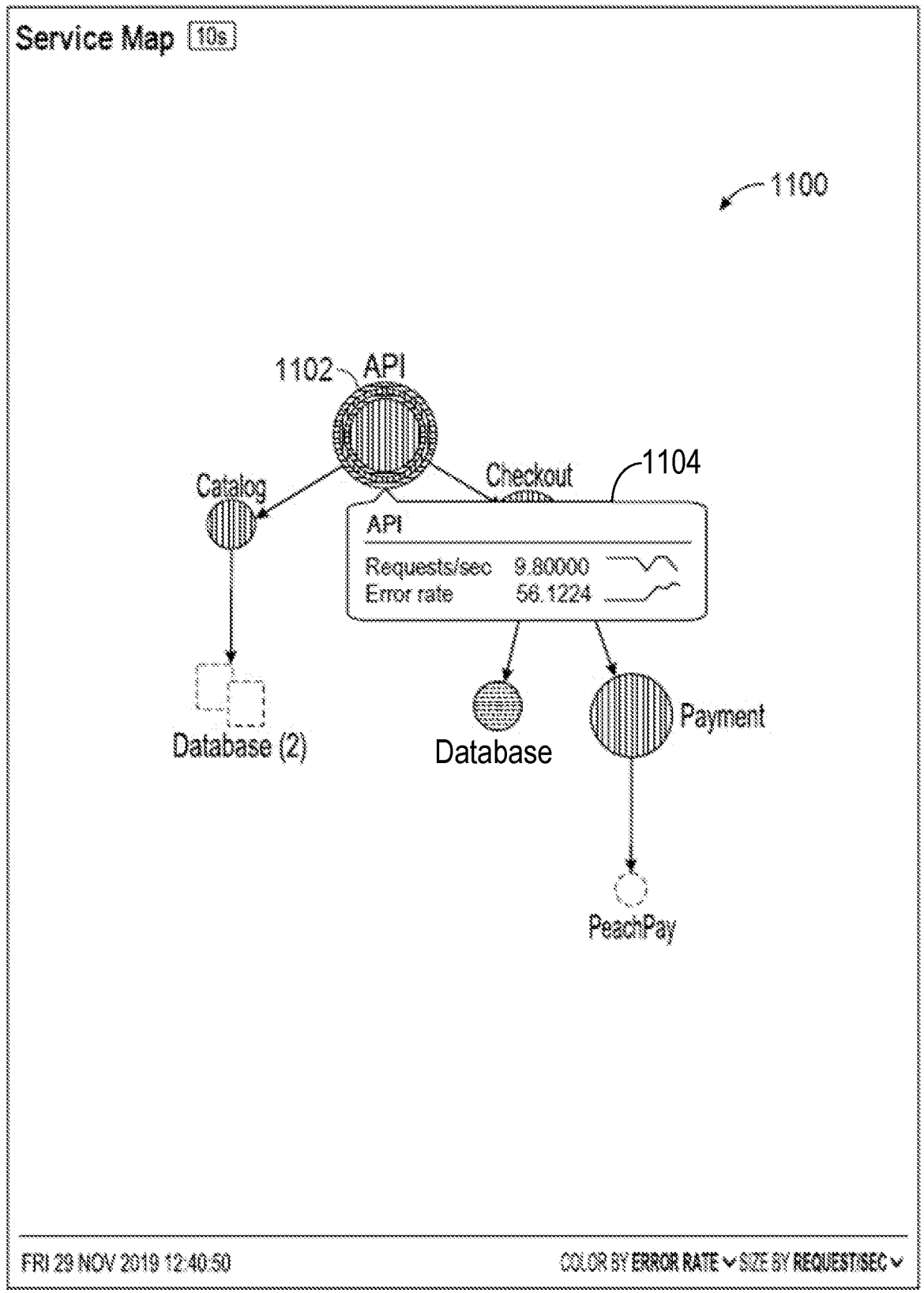

According to embodiments, an administrator may utilize the GUI to customize alerts. For example, an alert for a spike in error rate may have been set up by an administrator. As shown in FIG. 11, an alert 1100 for the api node 1102 may be triggered by the spike 1040 of FIG. 10. For example, the alert 1100 may be shown to a user as a halo around the api node 1102. Alert details 1104 may also be displayed. It is understood that alerts may be configured to be displayed in other ways. According to embodiments, the alert 1102 may also change a color of each node to display a level of criticality. For example, a healthy environment may show green nodes, intermediate health yellow/orange, and critically low health as red, etc.

Figure 12:
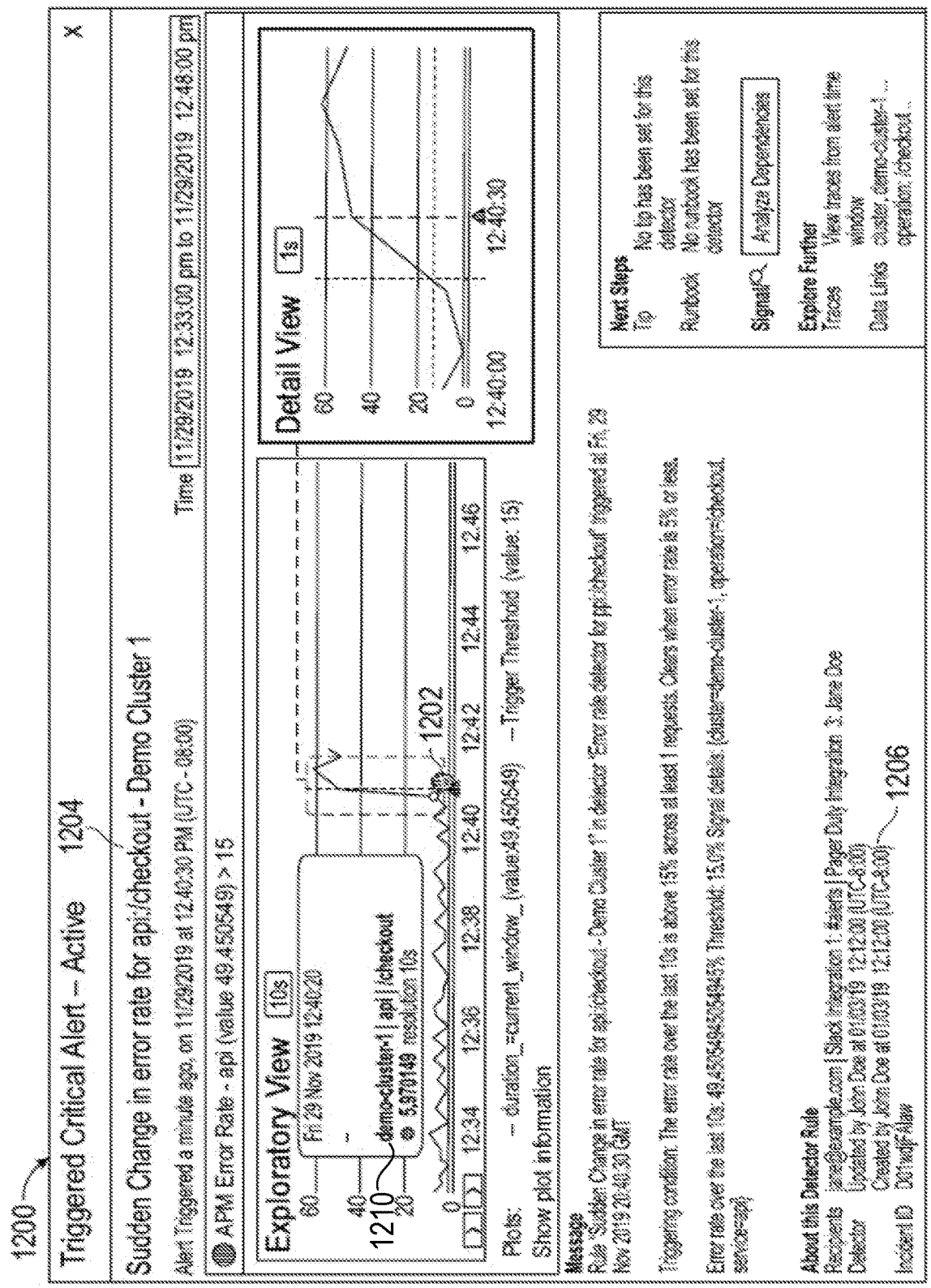

FIG. 12 illustrates a detailed alert 1200. For example, the detailed alert 1200 may show details of a spike 1202, including an endpoint 1204 that resulted in the error, and a specific signal 1210 that caused the alert 1100. Additional details 1206 of the alert 1100 may also be shown to the user so that the alert may be further adjusted.

Figure 13:
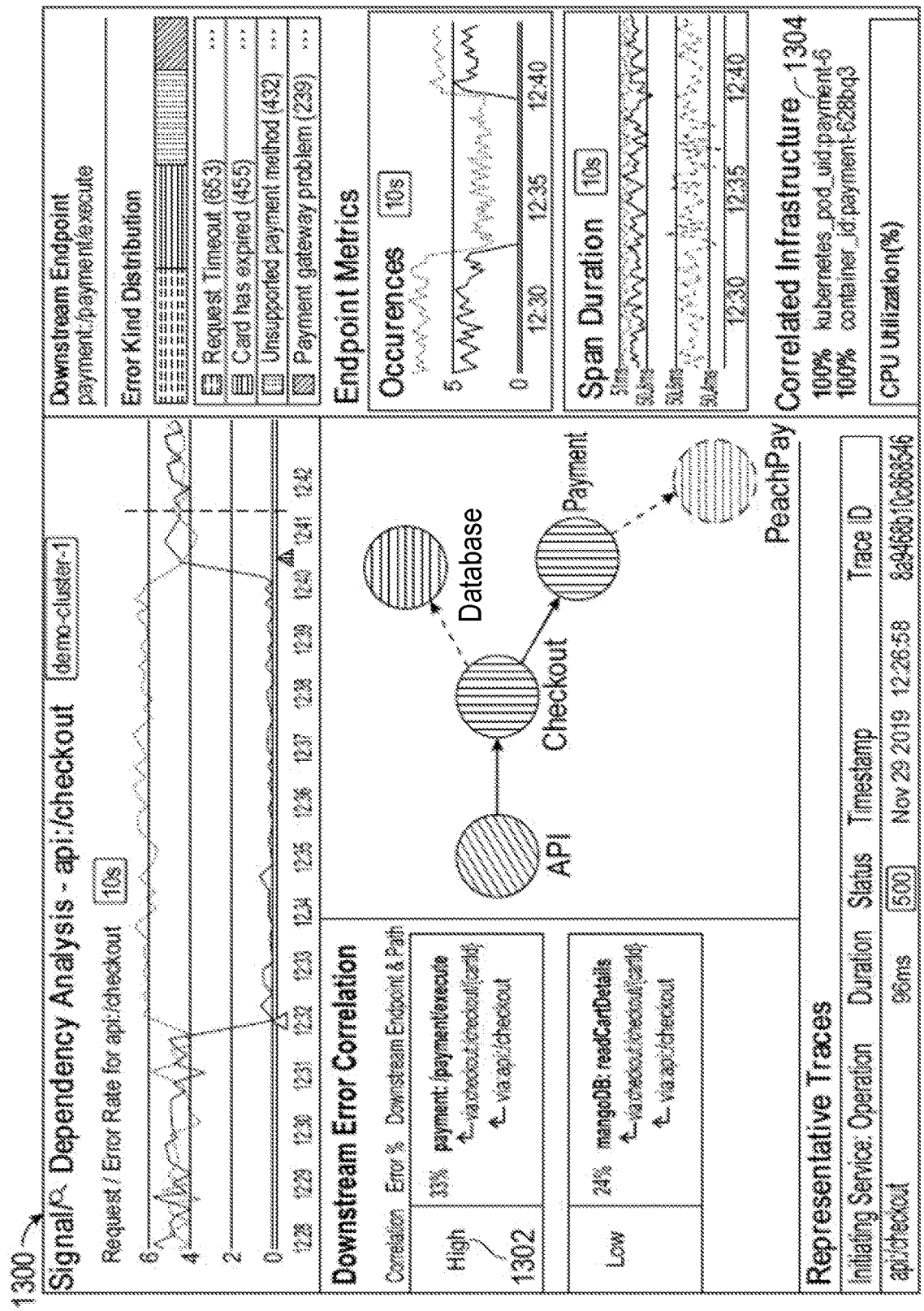

FIG. 13 illustrates results of a trace analysis 1300. For example, the trace analysis 1300 may be performed according to the above-described process in relation to FIGS. 3 to 14. As illustrated, an identified trace 1302 has been determined to be correlated to a highest error rate. For example, the identified trace 1302 shows that "payment: /payment/execute" is the most downstream endpoint that is contributing to the alert 1100. The results 1300 may also be configured to display an identified infrastructure element 1304 that is likely to be causing the alert 1100.

Figure 14:
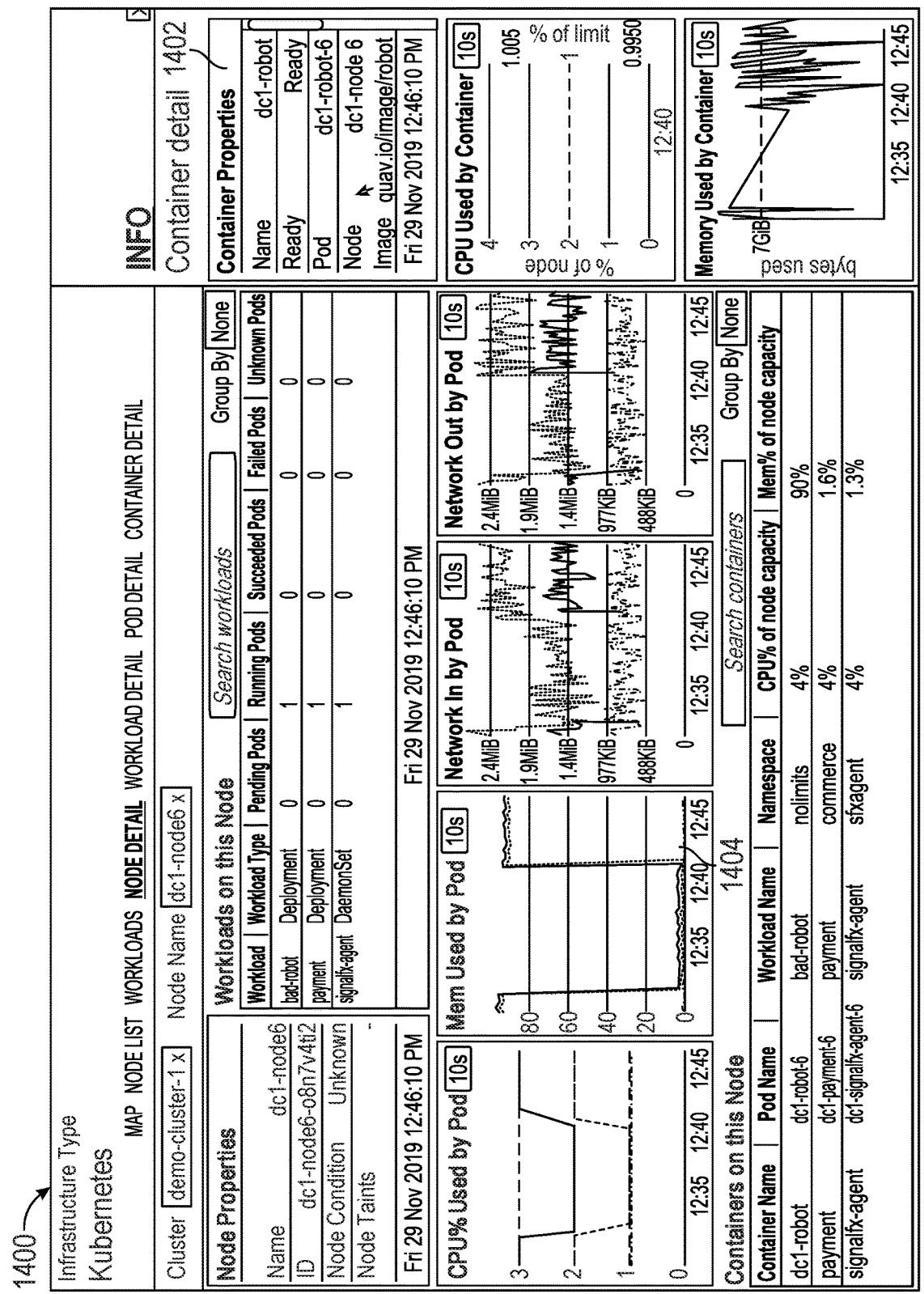

FIG. 14 illustrates a detailed view 1400 of the identified infrastructure element 1304 of FIG. 13. As illustrated, a memory percentage 1404 is disproportionately larger for a certain pod than for other pods. Based on this visual information, an administrator may successfully diagnose that a property of a container 1402 (e.g., a resource limit) is causing the alert 1100. For example, a memory limit may have been undefined. As a result, the memory limit may be corrected. As illustrated, a process of identifying a root cause of an alert may be greatly simplified while also improving efficiency and efficacy.

What is claimed is:

1. A computer-implemented method for identifying a root cause of an error, the method comprising:
    obtaining an error rate for an endpoint in a collection of services;
    determining whether the error rate exceeds a threshold;
    in response to determining that the error rate exceeds the threshold, retrieving a set of traces including the endpoint that resulted in an error;
    selecting a plurality of candidate error traces from the set of traces based on operations downstream from the endpoint;
    ranking the plurality of candidate error traces;
    identifying a root cause of the error based on the ranking of the plurality of candidate error traces;
    training a machine-learning algorithm to identify the root cause of the error based at least in part on the ranking of the plurality of candidate error traces;
    determining, through the machine learning algorithm, the root cause of the error; and
    causing for display a graphical representation of the root cause of the error, the graphical representation comprising a dashboard of a distributed microservices environment.

2. The computer-implemented method of claim 1, wherein retrieving the set of traces including the endpoint that resulted in an error further comprises:
    retrieving an error set and a baseline set from a datastore in response to an alert that the error rate exceeds the threshold, the error set comprising traces including the endpoint that resulted in an error, the baseline set comprising traces including the endpoint that executed successfully.

3. The computer-implemented method of claim 1, wherein ranking the plurality of candidate error traces further comprises:
    determining, for each trace, a first matrix of counts based on combinations of an error set and a baseline set, the error set comprising traces including the endpoint that resulted in an error, the baseline set comprising traces including the endpoint that executed successfully; and
    ranking the first matrix of counts based on a statistic.

4. The computer-implemented method of claim 1, further comprising:
    calculating a sum of traces that include an error trace and the endpoint, in which an operation performed by the endpoint resulted in the error, to determine a first count;
    calculating a sum of traces that include an error trace and the endpoint, in which an operation performed by the endpoint executed successfully, to determine a second count;
    calculating a sum of traces that do not include an error trace and the endpoint, in which an operation performed by the endpoint resulted in the error, to determine a third count; and
    calculating a sum of traces that do not include an error trace and the endpoint, in which an operation performed by the endpoint executed successfully, to determine a fourth count.

5. The computer-implemented method of claim 1, further comprising:
    determining that a probability that an endpoint results in an error, given an error trace is present, is higher than a probability that the endpoint results in the error given the error trace is not present.

6. The computer-implemented method of claim 1, further comprising:
    determining whether a baseline set is empty, the baseline set comprising traces including the endpoint that executed successfully; and
    in response to determining that the baseline set is empty, sorting error traces by a proportion of an error set including a given error trace, the error set comprising traces including the endpoint that resulted in an error.

7. The computer-implemented method of claim 1, wherein identifying the root cause of the error further comprises:
    recording, on spans of the traces, an infrastructure element on which an execution occurred; and
    for values of an infrastructure field, determining a second matrix of counts based on combinations of operations and infrastructure elements.

8. The computer-implemented method of claim 1, further comprising:
    ranking a second matrix of counts based on a statistic, the second matrix of counts based on combinations of operations and infrastructure elements; and determining a terminal error of a span of an error trace based on the ranking of the second matrix of counts, the terminal error identified by tracing the span to its corresponding infrastructure element.

9. The computer-implemented method of claim 1, further comprising determining a second matrix of counts, comprising:
calculating a sum of infrastructure fields that include operation errors to determine a fifth count;
calculating a sum of infrastructure fields that do not include operation errors to determine a sixth count;
calculating a sum of other infrastructure fields that do not include the infrastructure fields that include operation errors to determine a seventh count; and
calculating a sum of other infrastructure fields that do not include operation errors to determine an eighth count.

10. The computer-implemented method of claim 1, further comprising:
determining a probability of an operation error given an infrastructure field is higher than a probability of an operation error given another infrastructure field.

11. A system for identifying a root cause of an error, the system comprising:
at least one memory having instructions stored thereon; and
at least one processor configured to execute the instructions, wherein the at least one processor is configured to:
obtaining an error rate for an endpoint in a collection of services;
determining whether the error rate exceeds a threshold;
in response to determining that the error rate exceeds the threshold, retrieving a set of traces including the endpoint that resulted in an error;
selecting a plurality of candidate error traces from the set of traces based on operations downstream from the endpoint;
ranking the plurality of candidate error traces;
identifying a root cause of the error based on the ranking of the plurality of candidate error traces;
training a machine-learning algorithm to identify the root cause of the error based at least in part on the ranking of the plurality of candidate error traces;
determining, through the machine learning algorithm, the root cause of the error; and
causing for display a graphical representation of the root cause of the error, the graphical representation comprising a dashboard of a distributed microservices environment.

12. The system of claim 11, wherein the processor is further configured to:
retrieve an error set and a baseline set from a datastore in response to an alert that the error rate exceeds the threshold, the error set comprising traces including the endpoint that resulted in an error, the baseline set comprising traces including the endpoint that executed successfully.

13. The system of claim 11, wherein the processor is further configured to:
determine, for each trace, a first matrix of counts based on combinations of an error set and a baseline set, the error set comprising traces including the endpoint that resulted in an error, the baseline set comprising traces including the endpoint that executed successfully; and
rank the first matrix of counts based on a statistic.

14. The system of claim 11, wherein the processor is further configured to:

calculate a sum of traces that include an error trace and the endpoint, in which an operation performed by the endpoint resulted in the error, to determine a first count;
calculate a sum of traces that include an error trace and the endpoint, in which an operation performed by the endpoint executed successfully, to determine a second count;
calculate a sum of traces that do not include an error trace and the endpoint, in which an operation performed by the endpoint resulted in the error, to determine a third count; and
calculate a sum of traces that do not include an error trace and the endpoint, in which an operation performed by the endpoint executed successfully, to determine a fourth count.

15. The system of claim 11, wherein the processor is further configured to:
determine that a probability that an endpoint results in an error, given an error trace is present, is higher than a probability that the endpoint results in the error given the error trace is not present.

16. The system of claim 11, wherein the processor is further configured to:
determine whether a baseline set is empty, the baseline set comprising traces including the endpoint that executed successfully; and
in response to determining that the baseline set is empty, sort error traces by a proportion of an error set including a given error trace, the error set comprising traces including the endpoint that resulted in an error.

17. The system of claim 11, wherein the processor is further configured to:
record, on spans of the traces, an infrastructure element on which an execution occurred; and
for values of an infrastructure field, determine a second matrix of counts based on combinations of operations and infrastructure elements.

18. The system of claim 11, wherein the processor is further configured to:
rank a second matrix of counts based on a statistic, the second matrix of counts based on combinations of operations and infrastructure elements; and
determine a terminal error of a span of an error trace based on the ranking of the second matrix of counts, the terminal error identified by tracing the span to its corresponding infrastructure element.

19. The system of claim 11, wherein the processor is further configured to:
calculate a sum of infrastructure fields that include operation errors to determine a fifth count;
calculate a sum of infrastructure fields that do not include operation errors to determine a sixth count;
calculate a sum of other infrastructure fields that do not include the infrastructure fields that include operation errors to determine a seventh count; and
calculate a sum of other infrastructure fields that do not include operation errors to determine an eighth count.

20. The system of claim 11, wherein the processor is further configured to:
determine a probability of an operation error given an infrastructure field is higher than a probability of an operation error given another infrastructure field.

21. A non-transitory computer-readable storage medium comprising instructions stored thereon, which, when executed by one or more processors, cause the one or more processors to perform operations for identifying a root cause of an error, the operations comprising:

obtaining an error rate for an endpoint in a collection of services;

determining whether the error rate exceeds a threshold;

in response to determining that the error rate exceeds the threshold, retrieving a set of traces including the endpoint that resulted in an error;

selecting a plurality of candidate error traces from the set of traces based on operations downstream from the endpoint;

ranking the plurality of candidate error traces;

identifying a root cause of the error based on the ranking of the plurality of candidate error traces;

training a machine-learning algorithm to identify the root cause of the error based at least in part on the ranking of the plurality of candidate error traces;

determining, through the machine learning algorithm, the root cause of the error; and causing for display a graphical representation of the root cause of the error, the graphical representation comprising a dashboard of a distributed microservices environment.

22. The non-transitory computer-readable storage medium of claim 21, comprising further instructions which, when executed by the one or more processors, cause the one or more processors to perform operations comprising:

retrieving an error set and a baseline set from a datastore in response to an alert that the error rate exceeds the threshold, the error set comprising traces including the endpoint that resulted in an error, the baseline set comprising traces including the endpoint that executed successfully.

23. The non-transitory computer-readable storage medium of claim 21, comprising further instructions which, when executed by the one or more processors, cause the one or more processors to perform operations comprising:

determining, for each trace, a first matrix of counts based on combinations of an error set and a baseline set, the error set comprising traces including the endpoint that resulted in an error, the baseline set comprising traces including the endpoint that executed successfully; and ranking the first matrix of counts based on a statistic.

24. The non-transitory computer-readable storage medium of claim 21, comprising further instructions which, when executed by the one or more processors, cause the one or more processors to perform operations comprising:

calculating a sum of traces that include an error trace and the endpoint, in which an operation performed by the endpoint resulted in the error, to determine a first count;

calculating a sum of traces that include an error trace and the endpoint, in which an operation performed by the endpoint executed successfully, to determine a second count;

calculating a sum of traces that do not include an error trace and the endpoint, in which an operation performed by the endpoint resulted in the error, to determine a third count; and calculating a sum of traces that do not include an error trace and the endpoint, in which an operation performed by the endpoint executed successfully, to determine a fourth count.

25. The non-transitory computer-readable storage medium of claim 21, comprising further instructions which, when executed by the one or more processors, cause the one or more processors to perform operations comprising:

determining that a probability that an endpoint results in an error, given an error trace is present, is higher than a probability that the endpoint results in the error given the error trace is not present.

26. The non-transitory computer-readable storage medium of claim 21, comprising further instructions which, when executed by the one or more processors, cause the one or more processors to perform operations comprising:

determining whether a baseline set is empty, the baseline set comprising traces including the endpoint that executed successfully; and in response to determining that the baseline set is empty, sorting error traces by a proportion of an error set including a given error trace, the error set comprising traces including the endpoint that resulted in an error.

27. The non-transitory computer-readable storage medium of claim 21, comprising further instructions which, when executed by the one or more processors, cause the one or more processors to perform operations comprising:

recording, on spans of the traces, an infrastructure element on which an execution occurred; and for values of an infrastructure field, determining a second matrix of counts based on combinations of operations and infrastructure elements.

28. The non-transitory computer-readable storage medium of claim 21, comprising further instructions which, when executed by the one or more processors, cause the one or more processors to perform operations comprising:

ranking a second matrix of counts based on a statistic, the second matrix of counts based on combinations of operations and infrastructure elements; and determining a terminal error of a span of an error trace based on the ranking of the second matrix of counts, the terminal error identified by tracing the span to its corresponding infrastructure element.

29. The non-transitory computer-readable storage medium of claim 21, comprising further instructions which, when executed by the one or more processors, cause the one or more processors to perform operations comprising:

calculating a sum of infrastructure fields that include operation errors to determine a fifth count;

calculating a sum of infrastructure fields that do not include operation errors to determine a sixth count;

calculating a sum of other infrastructure fields that do not include the infrastructure fields that include operation errors to determine a seventh count; and calculating a sum of other infrastructure fields that do not include operation errors to determine an eighth count.

30. The non-transitory computer-readable storage medium of claim 21, comprising further instructions which, when executed by the one or more processors, cause the one or more processors to perform operations comprising:

determining a probability of an operation error given an infrastructure field is higher than a probability of an operation error given another infrastructure field.

\* \* \* \* \*